Nov. 22, 1966        H. M. BROWN        3,286,306
FIBER SEPARATOR

Filed Jan. 11, 1961        4 Sheets-Sheet 1

INVENTOR.
HUGH M. BROWN
BY Edward F. Roe
HIS ATTORNEY

Nov. 22, 1966  H. M. BROWN  3,286,306
FIBER SEPARATOR
Filed Jan. 11, 1961  4 Sheets-Sheet 2

INVENTOR.
HUGH M. BROWN
BY
HIS ATTORNEY

Nov. 22, 1966  H. M. BROWN  3,286,306
FIBER SEPARATOR

Filed Jan. 11, 1961  4 Sheets-Sheet 3

INVENTOR
HUGH M. BROWN

BY *Edward J. Noix*

HIS ATTORNEY

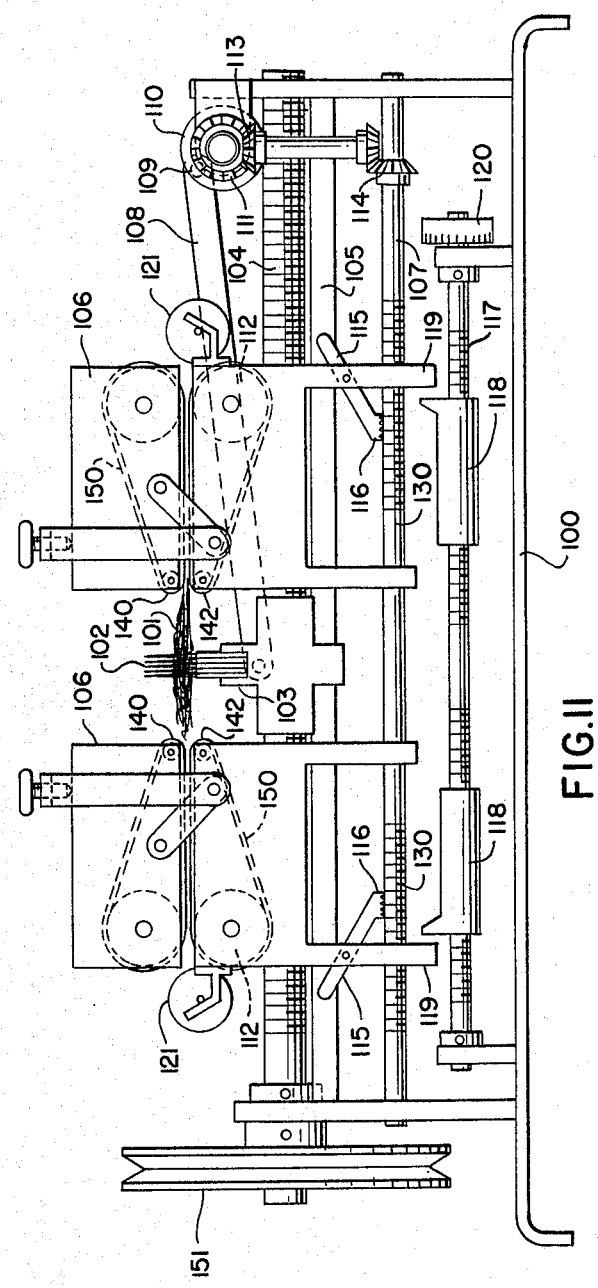

United States Patent Office 3,286,306
Patented Nov. 22, 1966

---

3,286,306
FIBER SEPARATOR
Hugh M. Brown, Clemson, S.C., assignor to The Sheffield Corporation, Dayton, Ohio, a corporation of Delaware
Filed Jan. 11, 1961, Ser. No. 81,993
7 Claims. (Cl. 19—65)

The present invention relates generally to a method and apparatus for determining the percentage of short fibers in a sample of fibrous material. The method and apparatus of the present invention have special application where it is desirable to ascertain the percentage of short fibers in a representative sample of a cotton crop, for example, to aid in establishing the quality and hence the price of the specific crop.

Accordingly, it is an object of the present invention to provide a method for accurately determining the percentage of short fibers in a sample of fibrous material wherein a minimum amount of working the sample is required and apparatus for carrying out that method.

It is another object of the present invention to provide a method and apparatus for extracting the fibers that project beyond a predetermined length from alternate ends of a sample and comparing the weight of the fibers thus extracted to the total weight of the sample for determining the percentage of short fibers in the sample.

A further object of the present invention is to provide a method for determining the proportion of fibers, not exceeding a given length to the total mass of fibers in a sample of fibrous material, comprising the steps of working the sample to generally arrange the fibers in roughly relative parallel arrangement by pulling tufts of fibers from the sample and superimposing these tufts onto the remaining portion of the sample, holding the sample in the middle thereof along a line generally transverse of the fiber length, extracting the outermost projecting fibers alternately from opposite sides of the sample while progressing inwardly so that the lengths of the projecting fibers gradually become shorter and shorter until the remaining fibers in the sample project only to a predetermined amount, and comparing the weight of the remaining fibers to the total weight of the sample.

It is a further object of the present invention to provide apparatus for causing relative movement between a fiber receiving member and suitable extracting means adapted to engage the fibers contained in the fiber receiving member and extract and collect the fibers that project from the fiber receiving member beyond a predetermined length, whereby the percentage of the short fibers in the sample may be determined.

A still further object of the present invention is to provide apparatus for separating the fibers that project beyond a predetermined length from a sample of fibrous material held in a fiber receiving member, wherein the fiber receiving member is moved relative to suitable extracting means in incremental steps until the fiber receiving member and the extracting means are a predetermined distance apart, whereby the projecting fibers will be extracted from the sample for determining the percentage of short fibers in the sample.

Yet another object of the present invention is to provide apparatus wherein extracting means are adapted to move incrementally into engagement with opposite sides of a fibrous sample for alternately extracting from each side of the sample the fibers projecting beyond a predetermined length in order to determine the percentage of short fibers in the sample.

It is a still further object of the present invention to provide apparatus for extracting the fibers projecting beyond a predetermined length from a sample of fibrous material, in which a fiber receiving member is adapted for movement relative to a frame and extracting means is provided to engage the fibrous sample and extract a portion of the fibers therefrom, actuating means inducing relative movement between the extracting means and the fiber receiving member, this relative movement being of changing amplitude so that the fibrous sample is stepped incrementally closer to the extracting means for extracting from the sample fibers of successively shorter length until all of the fibers projecting beyond the predetermined length are thereby extracted from the sample.

A still further object of the present invention is to provide apparatus for extracting the fibers projecting beyond a predetermined length from a sample of fibrous material, comprising a fiber receiving member pivotally mounted on a frame and an extracting means comprising a plurality of rollers for engaging the fibrous sample and extracting the projecting fibers therefrom, and actuating means adapted to move the fiber receiving member relative to the extracting means in sequentially increasing and decreasing amplitudes of oscillation being adjustable for determining the length of the fibers to be extracted from the fiber receiving member.

These and other objects and advantages of the method and apparatus of the present invention will be more readily apparent from the following description taken in view of the accompanying drawings in which:

FIGURE 11 is a front elevational view showing a modification of the present invention.

Figure 1:
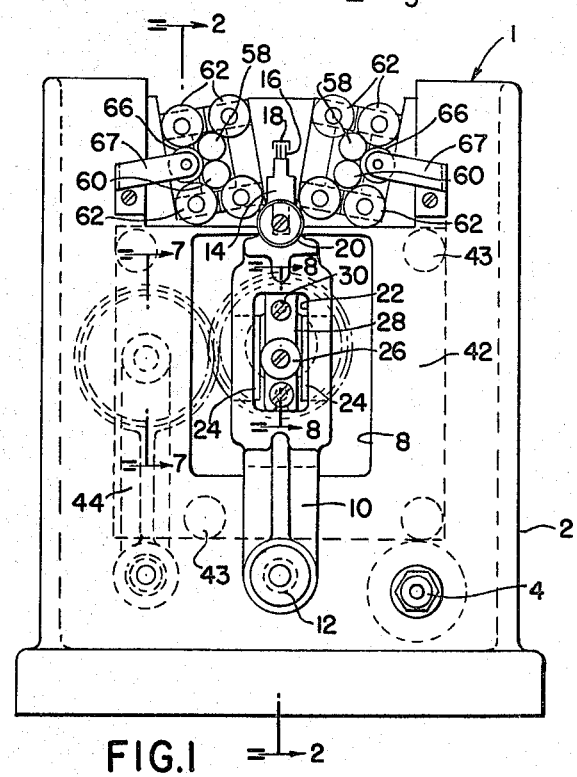
FIGURE 1 is a front elevational view of a preferred embodiment of the apparatus of the present invention.

According to the present invention, there is provided a method for determining the percentage of short fibers in a sample of fibrous material comprising a first step of working the sample to generally arrange the midpoints of the fibers therein in the middle of the sample. This is accomplished by holding a representative sample of cotton, for example, and pulling apart portions of the sample and superimposing these portions centrally on top of the remaining portion of the sample to roughly arrange the fibers in the sample very generally in parallel relationship. This working process is repeated approximately half a dozen times. The sample is then held along a holding zone that extends generally transversely of the fiber length. A comb 16 as shown in FIGURE 1 may be used as the holder so that the fibers are held fairly firmly at about the center of the sample, but loose enough so that long fibers can be extracted without breaking them. The fibers that project beyond a predetermined length from the holding zone are then alternately extracted from opposite ends of the sample. Extracting rollers 58 and 60 may serve this purpose. The extracting rollers 58 and 60 are adapted to engage the longer fibers projecting from the sample and to move progressively inwardly to extract fibers of successively shorter length until a predetermined distance from the holding zone is reached, at which time the extracting rollers are moved away from the sample. At this time the relatively short fibers remaining in the comb are removed therefrom and weighed, and the weight of the shorter fibers is then compared to the weight of the total sample to determine the percentage of short fibers in the sample.

A preferred embodiment for accomplishing the above described method is shown in FIGURE 1. There is provided a frame 2 comprising a base portion and upstanding wall portions. A comb support arm 10 is pivotally mounted on frame 2 at 12, and is formed in such manner that a portion thereof extends into an opening 8 in frame 2 for engagement with the actuating means, as will be hereinafter described. Removably mounted on top of support arm 10 is a comb slide 14 having mounted thereon comb 16 comprising a plurality of upstanding prongs and a clip 18 adapted to fit on top of the prongs. A knob 20 is provided on the end of slide 14 for facilitating removal thereof from support arm 10.

Figure 6:
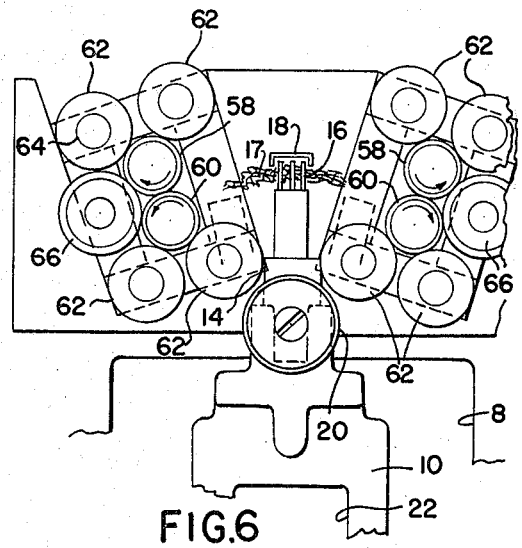
FIGURE 6 is an enlarged front elevational view of a portion of FIGURE 1.

The extracting means of the present invention preferably comprising a plurality of rollers is mounted on frame 2 on opposite sides of support arm 10 and equidistant therefrom. The extracting means on each side, as shown in FIG. 6, comprises a pair of rotatable extracting rollers 58 and 60, respectively, and a scavenger or collecting roll 66. Extracting rollers 58 and 60 are mounted on frame 2 relative to arm 10 in such manner that the fibers extending from comb 16 will engage extracting rollers 58 and 60 at their common tangential portion. Pressure rollers 62 mounted on shafts 64 provide the pressure necessary to enable extracting rollers 58 and 60 to extract fibers from the sample 17. Scavenger rolls 66 are supported on frame 2 by brackets 67 and are adapted to be easily removed from brackets 67 for removing the fibers collected thereon. Scavenger rolls 66 are covered with velvet or other suitable material to which the extracted fibers will adhere.

Figure 2:
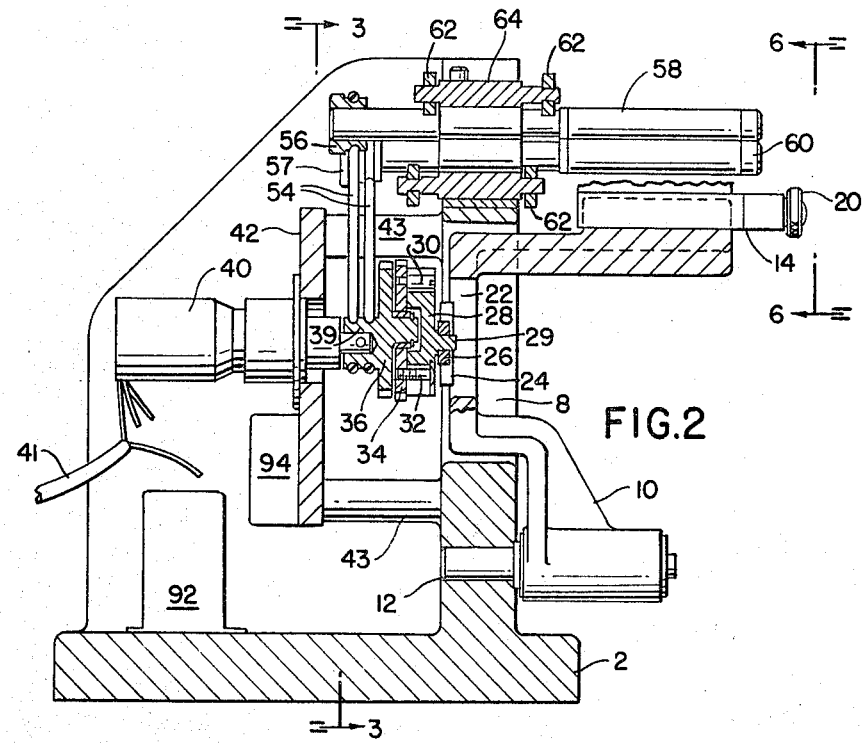
FIGURE 2 is a side view taken in section along the lines 2—2 of FIGURE 1.
Figure 3:
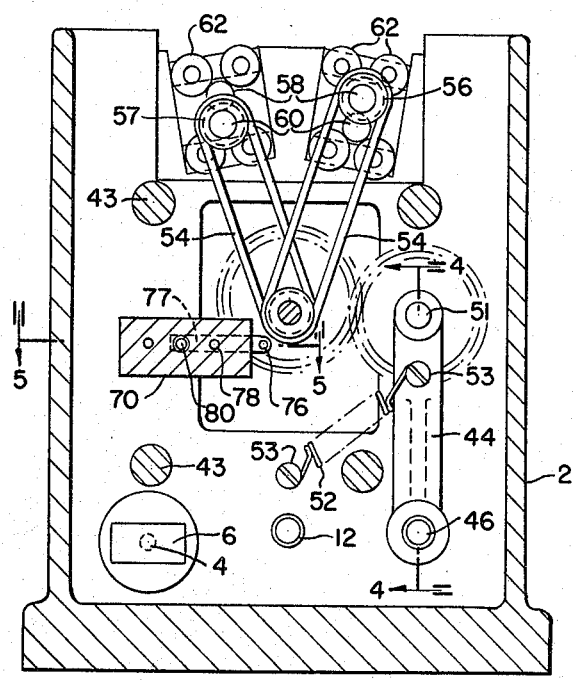
FIGURE 3 is a rear elevational view, partly in section, taken along the line 3—3 of FIGURE 2.

A suitable electric motor 40, as shown in FIG. 2, is mounted on bracket 42 and spaced from frame 2 by means of four bracket arms 43 and is operably connected to a suitable source of electricity by wire 41. Mounted on the shaft of motor 40 is a driving gear 36 having an integral double pulley wheel 39 attached thereto. A pair of drive belts 54 are mounted on pulley 39 and extend upwardly to pulleys 56 and 57 mounted on the rear portions of right hand extracting roller 58 and left hand extracting roller 60, respectively, as shown in FIGURE 3. The extracting rollers 58 and 60 are thus driven directly by motor 40.

Figure 4:
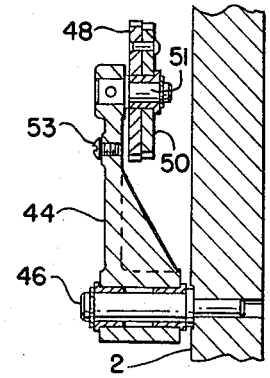
FIGURE 4 is a sectional view taken along the line 4—4 of FIGURE 3.
Figure 7:
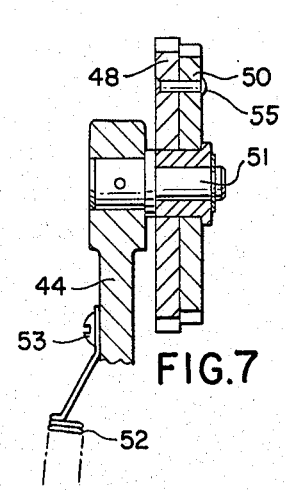
FIGURE 7 is a sectional view taken along the line of 7—7 of FIGURE 1.
Figure 9:
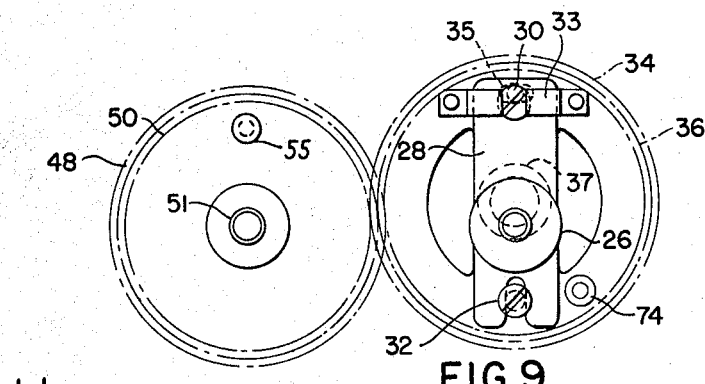
FIGURE 9 is a schematic elevational view illustrating the apparatus of FIGURES 7 and 8 in meshing engagement.

Pivotally mounted at 46 on frame 2 adjacent motor 40 is a gear arm 44, shown in FIG. 4 and FIG. 7, having journaled on shaft 51 thereof a pair of idler gears 48 and 50 secured together by rivet 55. Gear 48 is resiliently biased into engagement with gear 36 by spring 52 secured at one end thereof to frame 2 and at the other end thereof to arm 44 by screws 53. Gear 50 is meshed with driven gear 34 (FIG. 9) which is mounted on hub 37 of gear 36 for rotation relative thereto. A slide 28 is adjustably mounted on gear 34 and has a cam shaft 29 thereon for supporting a roller cam 26. Roller cam 26 engages a pair of roller guides 24 mounted on both sides of slot 22 in arm 10 for pivoting arm 10 relative to frame 2 responsive to motor 40 and the gear train comprising gears 36, 48, 50 and 34, respectively.

Figure 8:
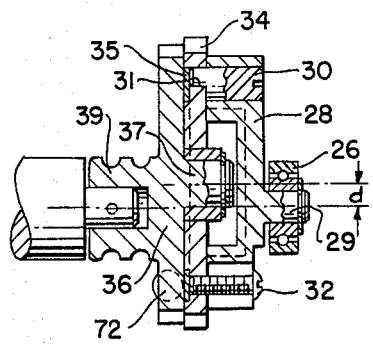
FIGURE 8 is a sectional view taken along the line of 8—8 of FIGURE 1.

Referring to FIGURE 8, it will be seen that the axis of roller cam 26 is aligned with the axis of pulley 39 and is offset from the common axis of gears 34 and 36 a distance indicated as $d$. Gears 36, 48, 50 and 34 have different numbers of teeth, with the resultant effect that gear 34 rotates at a slightly slower speed than gear 36. In this manner, gear 34 will lag behind gear 36 a certain angular amount for each revolution thereof, until after a predetermined number of revolutions gear 34 will have completed one less revolution than gear 36. In other words, gear 34 will rotate one complete revolution relative to gear 36. When this relative revolution is completed, an automatic cutoff switch is actuated, as will be hereinafter described, to complete the cycle of operation.

The movement which roller cam 26 describes in pivoting arm 10 during a cycle of operation may best be understood by comparing such movement to a planetary orbital movement, wherein roller cam 26 revolves about its own axis while it circumscribes an orbital path of radius $d$ about the common axis of gears 34 and 36. As roller cam 26 progresses along its orbital path it will gradually be traveling further away from its starting point until it completes 180° of its orbit, at which time it will gradually return to its starting point. Therefore the distance traveled from center by arm 10 on each successive oscillation thereof will be incrementally increased a linear distance corresponding to the angular distance which roller cam 26 moves until roller cam 26 completes 180° of its orbit, at which time the peak amplitude of oscillation of arm 10 is reached. As roller cam 26 orbits past the 180° mark it comes incrementally closer to its starting point thereby gradually reducing the amplitudes of oscillation of arm 10, until roller cam 26 reaches the starting point and the automatic cutoff switch is actuated.

The peak amplitude of oscillation of arm 10 and hence the proximity of sample 17 in comb 16 to extracting rollers 58 and 60 at this peak amplitude may be varied by adjusting slide 28 relative to gear 34, thus changing the distance $d$. Slide 28 is adjusted by loosening screw 32 and rotating member 30, the distal end 31 of which is eccentrically mounted in slot 35 in the face of gear 34. This rotation of member 30 will vary the distance $d$ and thereby change the maximum amplitude of oscillation of arm 10. A pair of retaining spring clips 33 are provided to prevent slide 28 from falling out of place when screw 32 is loosened for adjustment. When the desired adjustments have been made, screw 32 is tightened to secure slide 28 to gear 34.

Figure 5:
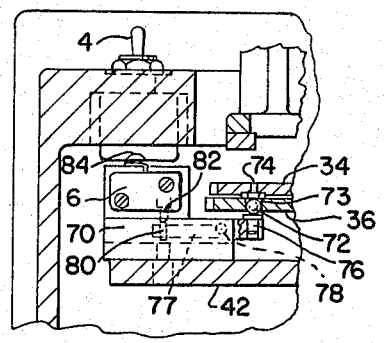
FIGURE 5 is a view, taken partly in section, of the line 5—5 of FIGURE 3.

Referring to FIGURE 5, there is shown a manually operated toggle switch 4 for initiating the operation of the unit. Operatively associated with toggle switch 4 is a micro-switch 6 which is automatically operated responsive to the cyclic operation of the unit. When roller cam 26 completes its cycle, a pin 74 in the rear face of gear 34 contacts a ball 72 carried within slot 73 in gear 36 and urges ball 72 into engagement with contact pin 76 mounted in one end of rod 77. Rod 77 is pivotally mounted on bracket 70 at 78 and has contact point 80 mounted on the other end thereof for engaging contact pin 82 in micro-switch 6 to thereby open micro-switch 6 and break the circuit and stop the operation of the unit.

Figure 10:
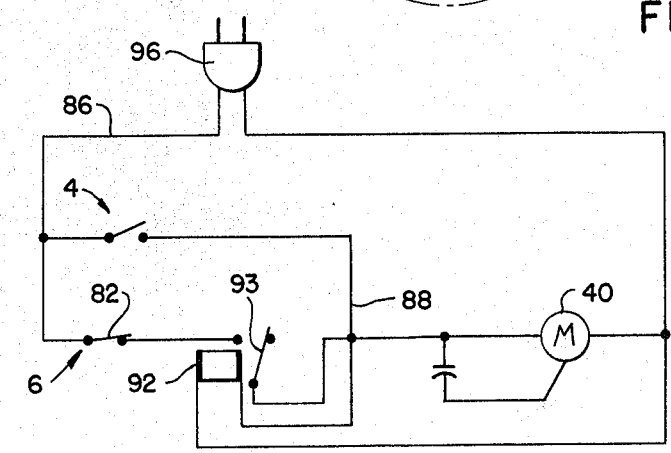
FIGURE 10 is a wiring diagram illustrating the electric circuit of the present invention.

FIGURE 10 is a diagrammatical sketch of the electrical circuit utilized with the apparatus of the present invention. Plug 96 is connected to a suitable source of electricity (not shown). When toggle switch 4 is momentarily closed, current will flow from line 86 through line 88 to energize motor 40. Toggle switch 4 then returns to its normally open position by means of a spring or the like. Motor 40 energizes coil relay 92 to draw relay switch 93 to the closed position. Since micro-switch 6 is normally in a closed position, current will continue to flow through the circuit as long as micro-switch 6 is closed. However, when a cycle of operation is completed, micro-switch 6 is opened by the engagement of contact point 82 with contact point 80 to thereby break the circuit.

In operation, motor 40 is energized to cause gear 36 and pulley wheel 39 to rotate. Extracting rollers 58 and 60 are rotated by belts 54 connected between the pulley wheel 39 and pulleys 56 and 57. Slide 28 and roller cam 26 mounted thereon are caused to rotate through the gear train 36, 48, 50 and 34 and thereby impart pivotal motion to arm 10. Arm 10 will be oscillated about the pivot point 12 in progressively increasing amplitudes of oscillation until a peak amplitude of oscillation is reached as determined by the distance d, as previously described. As arm 10 starts to oscillate, the outermost projecting fibers on both sides of sample 17 in comb 16 will alternately engage and be caught in the nip of extracting rollers 58 and 60 and will be extracted and transferred to the scavenger rolls 66 for collection. As the amplitudes of oscillation of arm 10 gradually increase, comb 16 will come closer to extracting rollers 58 and 60 on each subsequent oscillation of arm 10, thereby causing fibers of progressively shorter length to be extracted. After the peak amplitude of oscillation of arm 10 has been reached, the distance between comb 16 and the extracting rollers 58 and 60 on each subsequent oscillation will gradually increase until gear 34 has rotated 360° relative to gear 36 and roller cam 26 resumes its initial position to thereby realign pin 74 in the rear face of gear 34 with ball 72 carried in gear 36 to open micro-switch 6 and stop the operation of the unit.

At this time comb 16 is removed from arm 10 and the fibers remaining in comb 16 are removed and weighed by means of suitable weighing apparatus. Scavenger rolls 66 are then removed from brackets 67 and the fibers thereon are removed and added to the fibers taken from comb 16 to determine the weight of the entire sample. The percentage of short fibers in the entire sample is then calculated by dividing the weight of the fibers in comb 16 by the weight of the total sample.

It will be appreciated that in a sample of fibrous material a certain amount of looping will occur, whereby a portion of the longer fibers will be looped around shorter fibers or merely doubled over, so that when the above described extracting process takes place a portion of these doubled-over long fibers may remain in comb 16. A portion of the short fibers in the outer portions of the sample may be extracted therefrom along with the longer fibers looped therearound. However, it has been found that the above described method provides an accurate indication of the percentage of short fibers in a sample of fibrous material.

The above described apparatus is capable of being operated by relatively inexperienced personnel, primarily due to the fact that a minimum amount of working the sample is required. It is a simple matter for the operator to place the sample in the prongs of the comb and initiate operation of the unit merely by flipping a toggle switch.

A modified form of apparatus embodying and for carrying out the present invention is shown in FIGURE 11. Frame 100 is provided for supporting a main drive shaft 104 driven by pulley 151 which is attached to a suitable motor (not shown). The fibrous sample 101 is placed in comb 102 which is mounted on bracket 103. Bracket 103 is adapted to reciprocate longitudinally on drive shaft 104 and guide shaft 105 by means of connecting rod 108 eccentrically mounted on crank 109 of gear element 110, which is driven by main shaft 104 through a worm gear 111.

Transverse shaft 107 is driven from main shaft 104 by gears 113 and 114. Extracting rollers 140 and 142 on extracting units 106 are rotated through drums 112 and belts 150 by worm gears (not shown) engaging on main shaft 104. Extracting units 106 are caused to move inwardly by the engagement of the portion 116 of pawls 115 with the threaded portion 130 on transverse shaft 107. The inward motion of the extracting units 106 is limited by the engagement of member 119 of each extracting unit with a cooperating stop 118 adjustably mounted on indexing shaft 117. A calibrated head 120 is provided on indexing shaft 117 for permitting accurate setting of the nearest approach of the extracting units 106 to the comb 102 for thereby determining the length of the fibers that will be left in the comb.

As the fibers are alternately extracted from sample 101 by belts 150 on extracting rollers 140 and 142 from opposite sides of the sample, the extracted fibers are passed along belts 150 to scavenger rolls 121 for collection thereon. Extracting units 106 will continue to move inwardly for extracting progressively shorter fibers from sample 101 until the portion 119 of each extracting unit 106 contacts stops 118, whereupon the portion 116 of pawls 115 will be caused to disengage from the threaded portion 130 of transverse shaft 107. The operation of the unit is then stopped by conventional switch means (not shown) and the portions of the sample are collected from comb 102 and scavenger rolls 121, respectively and are weighed for determining the percentage of short fibers in the sample.

The apparatus described above and illustrated in the accompanying drawings is presented as illustrative only and by no means exhaustive for performing the method of the present invention. Therefore it will be understood that the present invention is not limited by the construction above described and illustrated but only as set forth in the appended claims.

What is claimed is:

1. Apparatus for separating fibers from a sample of fibrous material comprising a frame, a comb supported from said frame for receiving said sample, extracting means supported from said frame and including a plurality of rollers and fiber engaging belts associated therewith on each side of said comb for alternately engaging said sample on opposite sides thereof, means supported from said frame for causing relative movement between said comb and said extracting means to thereby extract a portion of the fibers from said sample, means operably associated with said rollers for collecting the extracted portion of the fibers, and adjustable stop means supported from said frame for limiting said relative movement.

2. Apparatus for separating fibers from a sample of fibrous material comprising a frame, fiber receiving means operably mounted on said frame for movement relative thereto, extracting means supported from said frame on opposite sides of said fiber receiving means and including a plurality of rollers on each side of said fiber receiving means for engaging said fibers in said fiber receiving means, actuating means supported from said frame for causing said fiber receiving means to move relative to said extracting means in varying amplitudes of movement during operation to thereby extract a portion of the fibers from said sample, and means operably associated with said rollers for collecting the extracted portion of the fibers.

3. Apparatus for separating fibers from a sample of fibrous material comprising a frame, fiber receiving means operably mounted on said frame for movement relative thereto, extracting means supported from said frame and including a plurality of rollers on each side of said fiber receiving means for alternately engaging said sample on opposite sides thereof, driving means mounted on said frame for actuating said extracting means, driven means operatively associated with said driving means for causing relative movement between said fiber receiving means and said extracting means to thereby extract a portion of the fibers from said sample, and means operatively associated with said driving means for automatically halting said relative movement after a predetermined period of operation.

4. Apparatus for separating fibers from a sample of fibrous material comprising a frame, fiber receiving means removably mounted on said frame, extracting means supported from said frame and adapted for alternately extracting a portion of the fibers longer than a predetermined length from opposite sides of the sample, actuating means supported from said frame for actuating said extracting means, means operatively associated with said actuating means for causing relative movement between said fiber receiving means and said extracting means to thereby extract a portion of the fibers from said sample, means for automatically gradually changing the amplitude of relative movement during a cycle of operation, and means responsive to said actuating means for cyclically controlling said relative movement.

5. Apparatus for separating fibers in excess of a predetermined length from a sample of fibrous material comprising a frame, fiber receiving means mounted on said frame, extracting means supported from said frame for alternately extracting fibers projecting beyond a predetermined length from opposite sides of the sample, actuating means supported from said frame in operative association with said extracting means, driven means pivotally mounted on said frame and biased into operative association with said actuating means, means operatively associated with said driven means and said actuating means and operably engaged with said fiber receiving means for causing relative movement of varying amplitude between said fiber receiving means and said extracting means to cause said extracting means to thereby extract a portion of the fibers from said sample, and automatic means responsive to said actuating means for cyclically controlling said relative movement.

6. Apparatus for separating fibers in excess of a predetermined length from a sample of fibrous material comprising a frame, fiber receiving means, means on said frame for supporting the fiber receiving means, extracting means supported from said frame including a plurality of rollers on each side of said fiber receiving means for alternately engaging said sample on opposite sides thereof, actuating means supported from said frame for actuating said extracting means, driven means pivotally mounted on said frame and resiliently biased into operative association with said actuating means, means operatively associated with said driven means and said actuating means and adapted for engagement with said fiber receiving means for causing relative movement of incrementally increasing and decreasing amplitudes of oscillation between said fiber receiving means and said extracting means to cause said rollers of said extracting means to engage the fibers in said sample and thereby extract a portion of the fibers therefrom, and automatic means responsive to said actuating means for cyclically controlling said relative movement.

7. Apparatus for separating fibers in excess of a predetermined length from a sample of fibrous material comprising a frame, an arm pivotally mounted on said frame for movement relative thereto, fiber receiving means removably mounted on said arm for receiving said sample, extracting means supported from said frame on opposite sides of said fiber receiving means and comprising a plurality of extracting rollers adapted to engage said sample and pick out fibers therefrom when engagement is made therewith, said extracting means further including a plurality of fiber collecting means operatively associated with said extracting rollers and adapted to collect the fibers extracted from said sample by said extracting rollers, actuating means supported from said frame for actuating said extracting means and including manual switch means, driven means pivotally mounted on said frame and operatively associated with said actuating means, adjustable means operatively associated with said driven means and said actuating means and adapted for engagement with said arm for causing said arm to move relative to said extracting means in incrementally increasing and decreasing amplitudes of oscillation to thereby bring the opposite sides of said sample into alternate engagement with said extracting rollers to thereby extract fibers extending beyond a predetermined length from said sample, and automatic switch means operatively associated with said manual switch means and responsive to said actuating means for cyclically limiting the oscillations of said arm.

References Cited by the Examiner

UNITED STATES PATENTS

| | | | |
|---|---|---|---|
| 1,452,352 | 4/1923 | Balls | 209—82 X |
| 1,452,353 | 4/1923 | Balls et al. | 19—65 |
| 1,493,578 | 5/1924 | Walen et al. | 19—65 |
| 2,325,026 | 7/1943 | Anway | 73—159 |
| 3,039,303 | 6/1962 | Reddick | 73—159 |

FOREIGN PATENTS 925,286    3/1955    Germany.

OTHER REFERENCES

A.S.T.M. Standards, part 5, 1949.

MERVIN STEIN, *Primary Examiner.*

CHARLES A. CUTTING, RICHARD C. QUEISSER, ROBERT R. MACKEY, D. O. WOODIEL, D. NEWTON, *Assistant Examiners.*